Dec. 22, 1931. C. W. JONES 1,837,777
PROCESS OF EXTRACTING IODINE FROM AQUEOUS SOLUTIONS
Filed Nov. 23, 1928
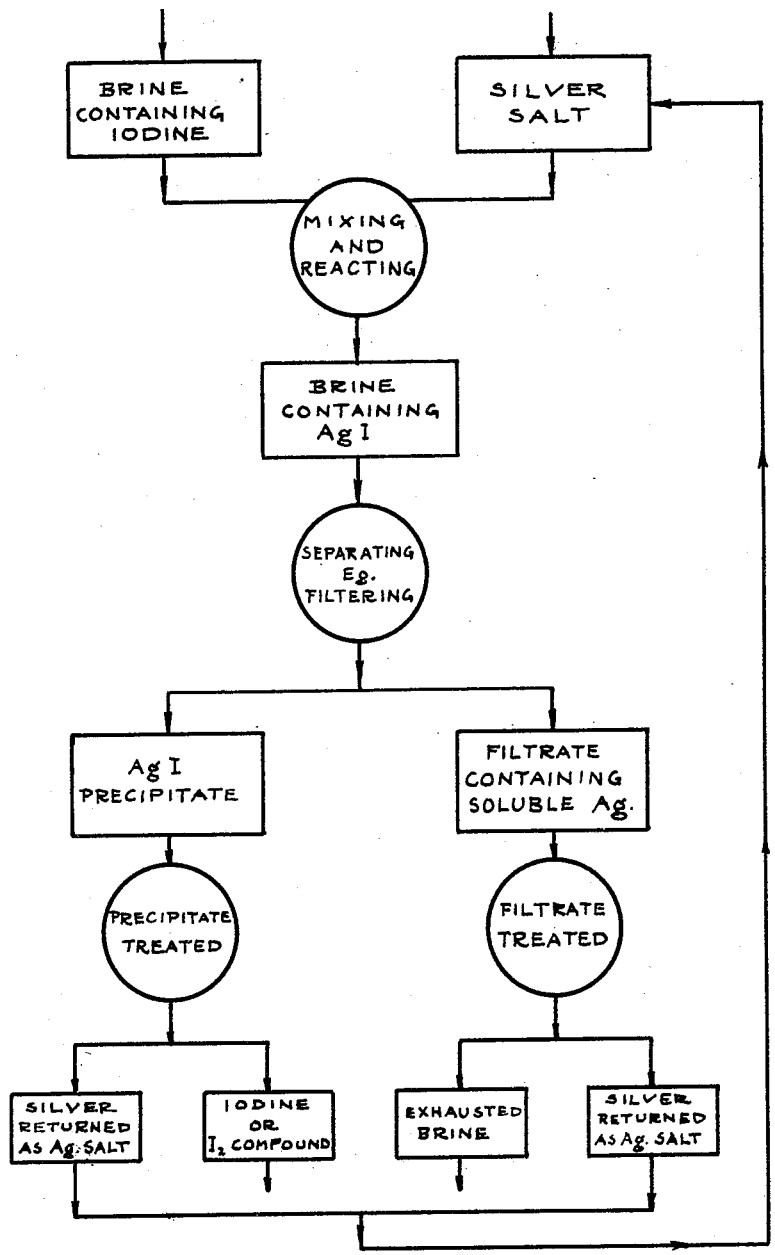
INVENTOR.
Coulter W. Jones.
BY
Fay, Oberlin & Fay
ATTORNEYS.

Patented Dec. 22, 1931

1,837,777

UNITED STATES PATENT OFFICE

COULTER W. JONES, OF McDADE, LOUISIANA, ASSIGNOR TO JONES CHEMICAL COMPANY, INCORPORATED, OF McDADE, LOUISIANA, A CORPORATION OF LOUISIANA

PROCESS OF EXTRACTING IODINE FROM AQUEOUS SOLUTIONS

Application filed November 23, 1928. Serial No. 321,367.

The present invention relates to improvements in methods for the production of iodine from salt solutions, mineral waters or mother liquors containing iodine compounds in small proportions which consist in treating said solutions or brines with a silver salt that is more soluble therein than silver iodide.

To the accomplishment of the foregoing and related ends, the invention, then, consists of the steps hereinafter fully described and particularly pointed out in the claims, the annexed drawing and the following description setting forth in detail several modes of carrying out the invention, such disclosed modes illustrating, however, but several of various ways in which the principle of the invention may be used.

In said annexed drawing:—

The single accompanying figure illustrates in diagrammatic form one preferred method of carrying out my improved process.

Referring more particularly to the drawing, the silver salt is added to the solution or brine containing the iodine compound where it reacts with said compound forming silver iodide. After the reaction has passed to substantial completion and coagulation has occurred the silver iodide may then be separated from the solution in any suitable manner, preferably by filtration. The silver iodide filter cake or other form thereof so obtained may then be treated in any suitable manner to produce either free iodine or desired iodine compounds, and the silver from this step may be recovered and returned to the first step in suitable combination.

After filtering the silver iodide from the treated solution, the filtrate which contains traces of silver salts is treated to recover a portion of this silver which would otherwise be lost. The so exhausted brine may then be discharged from the system and the recovered silver treated to form the desired silver salt which is returned to the first step for further treatment of iodine containing brine.

For example when treating a brine containing 35 to 40 parts of combined iodine per million, I prefer to add a silver salt such as silver nitrate to the brine in amount sufficient to just combine with all the iodine present. The brine and silver nitrate solution is then agitated and the silver iodide formed allowed to coagulate, following which the solution is passed through a suitable filter to remove the silver iodide. If the filter used for this purpose is relatively porous it will usually be necessary to use a filter aid such as fuller's earth to enable satisfactory recovery of this finely divided precipitate. The silver iodide precipitate is then reacted with metallic zinc to form zinc iodide and free silver:

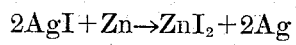
$$2AgI + Zn \rightarrow ZnI_2 + 2Ag$$

The zinc iodide may be marketed as such or may be treated in well known manner to produce either iodine or other iodine compounds. The silver liberated by the zinc is then treated with concentrated nitric acid to form silver nitrate which is returned to the first step for treating iodine containing brine.

The filtrate obtained from the filtration step I have found will contain a trace of silver salt amounting to less than 3 parts per million. However, the first filtrate coming from the filtration step sometimes carries a much higher percentage of silver iodine and should accordingly be recirculated to the filter until the silver content of the filtrate approaches the solubility of silver iodide under the conditions of operation. While the filtrate could be passed out of the system without further treatment, I prefer to pass it over a metal higher than silver in the electromotive series, for instance, iron, zinc or copper, which will precipitate silver present in small amount and allow its recovery. The silver thus recovered is then reacted with nitric acid to form silver nitrate which is returned to the first step for treating the iodine-containing brine.

Instead of recovering silver from the silver iodide precipitate by treating with metallic zinc, the silver iodide may be treated with chlorine to form silver chloride and free iodine:

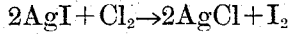
$$2AgI + Cl_2 \rightarrow 2AgCl + I_2$$

the silver chloride being returned to the first step for treatment of raw brine in similar manner to the silver nitrate made from the silver iodide precipitate as explained in the example above. The silver chloride thus produced may be satisfactorily returned to the first step for further treatment of the raw brine simultaneously with makeup silver nitrate and silver nitrate from the step of reclaiming silver from the filtrate, and will react with the iodine compound in the brine to precipitate the more insoluble silver iodide.

In similar manner to the first example the brine may be treated with silver sulphate to precipitate silver iodide. By treating the silver iodide precipitate with hot concentrated sulphuric acid and a little oxidizing agent, such as bleaching powder, silver sulphate is formed and iodine liberated. The silver sulphate is then returned to the first step for treating iodine containing brine. The silver recovered from the filtrate may likewise be reacted with hot concentrated sulphuric acid to form silver sulphate for returning to the first step.

While the silver salt may be added to the iodine containing brine in a large tank at the start of the process, I prefer to add it in approximately proper proportion directly to the brine as it flows into the system. From this point the brine may be satisfactorily handled either by the batch or continuous method depending upon the equipment available or other influencing factors.

I have found that the amount of agitation necessary to substantially complete the reaction between the added silver salt and iodine compounds in the brine varies with the solubility of such silver salt added to the brine, the least soluble salt requiring the greatest amount of agitation.

While I have used in my examples a brine containing 35 to 40 parts of iodine per million, I do not wish to be limited to that amount as my process is equally applicable to brines, mineral waters and mother liquors containing iodine in amounts exceeding five parts per million.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. The method of producing iodine or an iodine compound on a commercial scale from solutions containing small quantities thereof such as iodine containing mineral waters, which comprises treating the solution with a silver salt more soluble therein than silver iodide.

2. The method of producing iodine or an iodine compound on a commercial scale from solutions containing small quantities thereof such as iodine containing mineral waters, which comprises treating the solution with silver nitrate.

3. The method of producing iodine or an iodine compound on a commercial scale from solutions containing small quantities thereof such as iodine containing mineral waters, comprising the steps of treating the solution with a suitable silver salt, agitating and allowing the silver iodide formed to coagulate and subsequently separating said silver iodide.

4. The method of producing iodine or an iodine compound on a commercial scale from solutions containing small quantities thereof such as iodine containing mineral waters, comprising the steps of treating the solution with silver nitrate, agitating and allowing the silver iodide formed to coagulate and subsequently separating said silver iodide.

5. The method of producing iodine on a commercial scale from solutions containing small quantities thereof such as iodine containing mineral waters, comprising the steps of treating the solution with a suitable silver salt, agitating and allowing the silver iodide formed to coagulate, separating the so formed iodide and treating the same to produce free iodine or other iodide compounds.

6. The method of producing iodine on a commercial scale from solutions containing small quantities thereof such as iodine containing minerals, comprising the steps of treating the solution with silver nitrate, agitating and allowing the silver iodide formed to coagulate, separating the so formed iodide and treating the same to produce free iodine or other iodine compounds.

7. The method of producing iodine from solutions containing small quantities thereof, comprising the steps of treating the solution with a suitable silver salt, agitating and allowing the silver iodide formed to coagulate, separating the iodide so formed and treating the same to produce free iodine or other iodine compounds, returning the silver recovered from the last step in the form of a silver salt reactable on iodides to the beginning of the process for recycling therein.

8. The method of producing iodine from solutions containing small quantities thereof, comprising the steps of treating the solution with silver nitrate, agitating and allowing the silver iodide formed to coagulate, separating the iodide so formed and treating the same to produce free iodine or other iodine compounds, returning the silver recovered from the last step in the form of a silver salt reactable on iodides to the beginning of the process for recycling therein.

9. The method of producing iodine from solutions containing small quantities thereof, comprising the steps of treating the solution with a suitable silver salt, agitating and allowing the silver iodide formed to coagulate, separating the iodide so formed, treating the same to produce free iodine or other iodine compounds, returning the silver recovered from this step and from treating the filtrate, to the beginning of the process in suitable form for recycling therein.

10. The method of producing iodine from solutions containing small quantities thereof, comprising the steps of treating the solution with silver nitrate, agitating and allowing the silver iodide formed to coagulate, separating the iodide so formed and treating the same to produce free iodine or other iodine compounds, returning the silver recovered from this step and from treating the filtrate, to the beginning of the process in suitable form for recycling therein.

11. The method of producing iodine from solutions containing small quantities thereof, comprising the steps of treating the solution with a suitable silver salt, agitating and allowing the silver iodide formed to coagulate, separating the iodide so formed and treating the same to produce free iodine or other iodine compounds, returning the silver recovered from this step and from treating the filtrate with a suitable metal, to the beginning of the process in suitable form for recycling therein.

12. The method of producing iodine from solutions containing small quantities thereof, comprising the steps of treating the solution with silver nitrate, agitating and allowing the silver iodide formed to coagulate, separating the iodide so formed and treating the same to produce free iodine or other iodine compounds, returning the silver recovered from this step and from treating the filtrate with a suitable metal, to the beginning of the process in suitable form for recycling therein.

13. The method of producing iodine from solutions containing small quantities thereof, comprising the steps of treating the solution with a suitable silver salt, agitating and allowing the silver iodide formed to coagulate, separating the iodide so formed and treating the same to produce free iodine or other iodine compounds, returning the silver recovered from this step and from treating the filtrate with iron to the beginning of the process in suitable form for recycling therein.

14. The method of producing iodine from solutions containing small quantities thereof, comprising the steps of treating the solution with silver nitrate, agitating and allowing the silver iodide formed to coagulate, separating the iodide so formed and treating the same to produce free iodine or other iodine compounds, returning the silver recovered from this step and from treating the filtrate with iron to the beginning of the process in suitable form for recycling therein.

15. The method of producing iodine or an iodine compound on a commercial basis in substantially pure form from solutions containing small quantities thereof, which consists in treating the solution with a silver salt more soluble therein than silver iodide in amount approximating that required to completely react with the combined iodine.

16. The method of producing iodine or an iodine compound on a commercial basis in substantially pure form from solutions containing small quantities thereof, which consists in treating the solution with silver nitrate in amount approximately that required to completely react with the combined iodine.

17. In a method of producing iodine or an iodine compound on a commercial basis in substantially pure form from solutions containing small quantities thereof, the steps which consist in treating the solution with a suitable silver salt in amount approximating that required to completely react with the combined iodine, agitating, and allowing the silver iodide formed to coagulate and subsequently separating said silver iodide.

18. In a method of producing iodine or an iodine compound from solutions containing small quantities thereof, the steps which consist in treating the solution with silver nitrate in amount approximating that required to completely react with the combined iodine, agitating and allowing the silver iodide formed to coagulate, separating the iodide so formed and treating the same to produce free iodine or other iodine compounds, returning the silver recovered from the last step in the form of a silver salt reactable on iodides to the beginning of the process for recycling therein.

19. The method of producing iodine or an iodine compound on a commercial scale from solutions containing small quantities thereof, such as iodine-containing mineral waters, which comprises treating the solution with silver sulphate.

20. The method of producing iodine or an iodine compound on a commercial scale from solutions containing small quantities thereof, such as iodine-containing mineral waters, which comprises treating the solution with silver chloride.

Signed by me this 17th day of November, 1928.

COULTER W. JONES.